United States Patent
Blagodurov et al.

(10) Patent No.: US 9,104,498 B2
(45) Date of Patent: Aug. 11, 2015

(54) MAXIMIZING SERVER UTILIZATION WITHIN A DATACENTER

(75) Inventors: Sergey Blagodurov, Burnaby (CA); Martin Arlitt, Calgary (CA); Daniel Juergen Gmach, Palo Alto, CA (US); Yuan Chen, Sunnyvale, CA (US); Chris D. Hyser, Victor, NY (US); Cullen E. Bash, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 13/562,764

(22) Filed: Jul. 31, 2012

(65) Prior Publication Data
US 2014/0040474 A1  Feb. 6, 2014

(51) Int. Cl.
G06F 15/173 (2006.01)
G06F 9/50 (2006.01)

(52) U.S. Cl.
CPC ............ *G06F 9/5088* (2013.01); *G06F 9/5094* (2013.01); *Y02B 60/142* (2013.01); *Y02B 60/162* (2013.01)

(58) Field of Classification Search
None
See application file for complete search history.

(56) References Cited

U.S. PATENT DOCUMENTS

| | | | |
|---|---|---|---|
| 8,209,413 B1* | 6/2012 | Turrichi et al. | 709/224 |
| 8,245,059 B2* | 8/2012 | Jackson | 713/300 |
| 8,626,918 B2* | 1/2014 | Moore et al. | 709/226 |
| 2003/0115244 A1* | 6/2003 | Molloy et al. | 709/105 |
| 2006/0020691 A1* | 1/2006 | Patterson et al. | 709/223 |
| 2008/0077366 A1* | 3/2008 | Neuse et al. | 703/2 |
| 2009/0187776 A1* | 7/2009 | Baba et al. | 713/320 |
| 2011/0185064 A1 | 7/2011 | Head et al. | |
| 2011/0213508 A1 | 9/2011 | Mandagere et al. | |
| 2012/0089726 A1 | 4/2012 | Doddavula | |

* cited by examiner

*Primary Examiner* — Mohamed Ibrahim
(74) *Attorney, Agent, or Firm* — Van Cott, Bagley, Cornwall & McCarthy

(57) ABSTRACT

A method of maximizing server utilization within a datacenter comprising collocating a number of workloads to a subset of a number of physical servers within a datacenter, adjusting access to resources by critical and non-critical workloads, isolating a number of critical workloads that share resources to the subset of resource instances, and controlling resource utilization of the collocated workloads. A system for collocating workloads in a datacenter, the system comprising a number of servers communicatively coupled to each other and a collocation module that receives information from each server and decides whether to leave a workload running on one of any of the servers on that server, or migrate a workload running on one of the number of servers to another server.

19 Claims, 5 Drawing Sheets

MAXIMIZING SERVER UTILIZATION WITHIN A DATACENTER

BACKGROUND

Datacenters consume a relatively large amount of power. The demand for larger amounts of datacenter infrastructure increases as the number of digital services increase. However, any increase in datacenter infrastructure may be inappropriate because each individual server may not be used in the most efficient or effective manner. Specifically, any number of servers within a datacenter may be underutilized and may be consuming close to the amount of power than it otherwise would have had it been fully utilized. The ratio of power consumption between an underutilized server within the datacenter and a fully utilized server are disproportional. Indeed, it has been asserted that the energy efficiency or the amount of work completed per Watt of energy consumed of commodity systems at 30% load can be less than half the efficiency at 100%. Therefore, adding an additional amount of underutilized servers to a datacenter may not be a viable solution.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
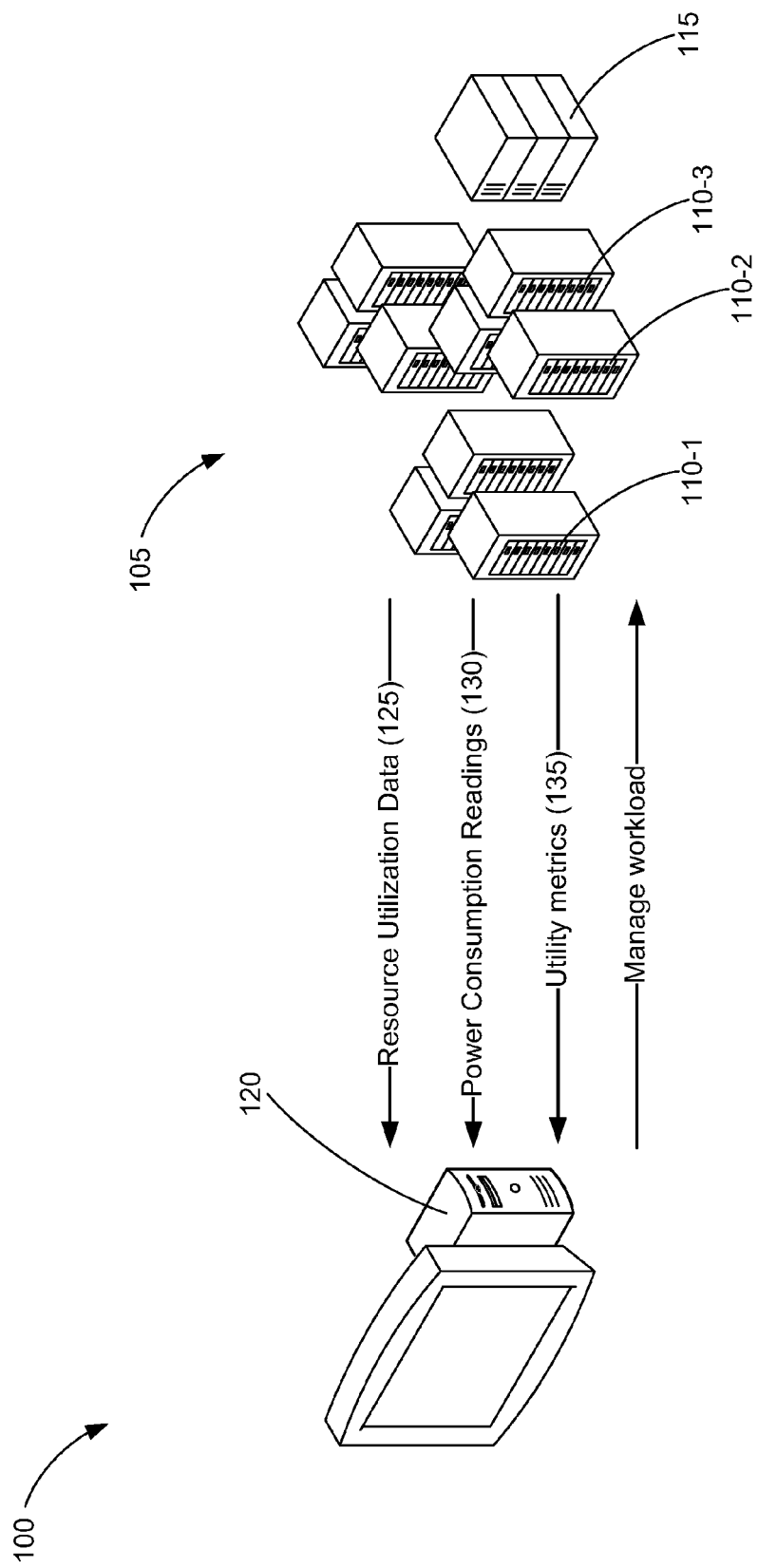
FIG. 1 is a block diagram of a system for automated workload collocation in a datacenter according to one example of principles described herein.

As briefly mentioned above, servers within datacenters tend to consume disproportional amounts of energy compared to the amount of work completed by each server. Costs can increase as more servers that are not fully utilized are added to the datacenter. Attempts have been made to increase the efficiency of each individual server. However, the power consumption of an underutilized server within a datacenter still remains disproportionally high.

Additionally, datacenters may provide a number of services to customers, some of which may be defined as a critical or non-critical workload on the server. One non-limiting example of a critical workload may be an interactive workload where a user may request information from a server and that information is to be provided to that user relatively immediately. Frequently datacenter managers do not cause the servers that service the interactive workload to be fully utilized due to the response times to requests tending to get relatively long. Using this schema, some datacenter managers choose to add more servers to the datacenter to accommodate for fluctuations in the demand for resources throughout any given period. This, in turn, increases the purchasing (CapEx) and operating (OpEx) costs of the datacenter.

If a datacenter administrator does not add additional servers to the datacenter, the contention over resources within the datacenter results in concerns that some of the SLAs for the critical workloads may be violated. The contention between workloads may become even more extreme when the power budget of the datacenter is scarce and when workloads are to be consolidated onto fewer servers in order to reduce datacenter power demand.

The present specification, therefore, describes a method for managing the collocation of critical and non-critical workloads in a datacenter setting while still meeting the SLAs associated with the critical workloads. The critical and non-critical workloads executed on the datacenter may be implemented on a virtualized server, a non-virtualized server, or combinations thereof. In one example, application specific migration or checkpointing could be used to help consolidate those processes being executed on the datacenter onto a subset of servers within the datacenter.

The present application also describes a method of maximizing server utilization within a datacenter comprising collocating a number of workloads to a subset of a number of physical servers within a datacenter; adjusting access to resources by critical and non-critical workloads; isolating a number of critical workloads that share resources to the subset of the number of resource instances; and controlling resource utilization of the collocated workloads.

The present application further describes a system for collocating workloads in a datacenter, the system comprising: a number of servers communicatively coupled to each other; and a collocation module that receives information from each server and decides whether to migrate a workload running on one of the number of servers to another server.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

In the present specification and in the appended claims, the term "critical workload" is meant to be understood broadly as any transactional or interactive service provided by the datacenter where each operator action causes a delay-sensitive response from the program or the system. Some examples of critical workloads may include bank transactions, auctioning transactions, and other transactions where an operator action causes a delay-sensitive response from a program or a system, among others.

Additionally, in the present specification and in the appended claims the term "non-critical workload" is meant to be understood broadly as any workload where a number of records are processed with little or no action from the user or operator and to which a response is not delay-sensitive. Some examples of non-critical workloads may include billing transactions, simulations, and financial analysis transactions, among others. Consequently, unlike critical workloads, non-critical workloads may allow for more flexibility such that an immediate response from the datacenter may not be necessary.

Further, in the present specification and in the appended claims, the term "resource" or "computer resource" is meant to be understood broadly as any physical or virtual component within a computer system. Examples may include CPU capacity, memory access and capacity, disk access and capacity, and network I/O bandwidth. Therefore, in the present specification, certain processes or workloads may have their resources limited. Although this resource limitation may be described as a specific limitation of a specific resource, the present specification also describes the limitations of other resources besides those specifically described.

Even further, in the present specification and in the appended claims, the term "SLA violation counter" is meant to be understood broadly as a count of SLA violations associated with a workload. In one example, the SLA violation count is gradually decreased towards 0 as long as a utility metric satisfies an SLA associated with a workload. Therefore, the SLA violation counter is not incremented over the entire runtime of a critical or non-critical workload, but is instead continually reevaluated at the beginning of each scheduling interval to determine if the SLA had been violated in the previous interval.

Still further, in the present specification and in the appended claims, the term "server" is meant to be understood broadly as any computer program running to serve the requests of other programs. Therefore, a server may include computer hardware and the computer program running thereon, or a computer program such as a virtual server.

FIG. 1 is a block diagram of a system (100) for automated workload collocation in a datacenter (105) according to one example of principles described herein. The system (100) may include a number of data servers (110-1, 110-2, 110-3), a network storage device (115), and a number of head nodes (120). Each of these will now be described in more detail.

The number of data servers (110-1, 110-2, 110-3) may include any number and type of data servers. Therefore, although in FIG. 1 three servers (110-1, 110-2, 110-3) are labeled, the datacenter (105) may include any number of servers in any configuration. Additionally, each server (110-1, 110-2, 110-3) may support any number of applications or application components on a virtual machine (VM). In one example, the resources of the number of servers (110-1, 110-2, 110-3) such as the CPU capacity, memory access and capacity, disk access and capacity, and network I/O bandwidth are shared by the hosted VMs.

Each server is connected to the network storage device (115) with each VM located on each server (110-1, 110-2, 110-3) having access to the network storage device (115) via a network connection. Each server (110-1, 110-2, 110-3) may be allowed to migrate any number of VMs to other servers during the consolidation process described herein.

In one example, a single server or a number of servers among the number of servers (110-1, 110-2, 110-3) may be dedicated to be a head node (120). As the head node (120), the server (120) may be responsible for receiving information regarding each of the servers' (110-1, 110-2, 110-3) resource utilization (125), the individual virtual machines' utility metrics (135), and each of the servers' power consumption (130). A head node (120) may manage the workload on the datacenter (105) and specifically with each server (110-1, 110-2, 110-3). The head node (120) may further include a user interface allowing an administrator to initiate consolidation commands or review the utilization of each server (110-1, 110-2, 110-3).

Figure 2:
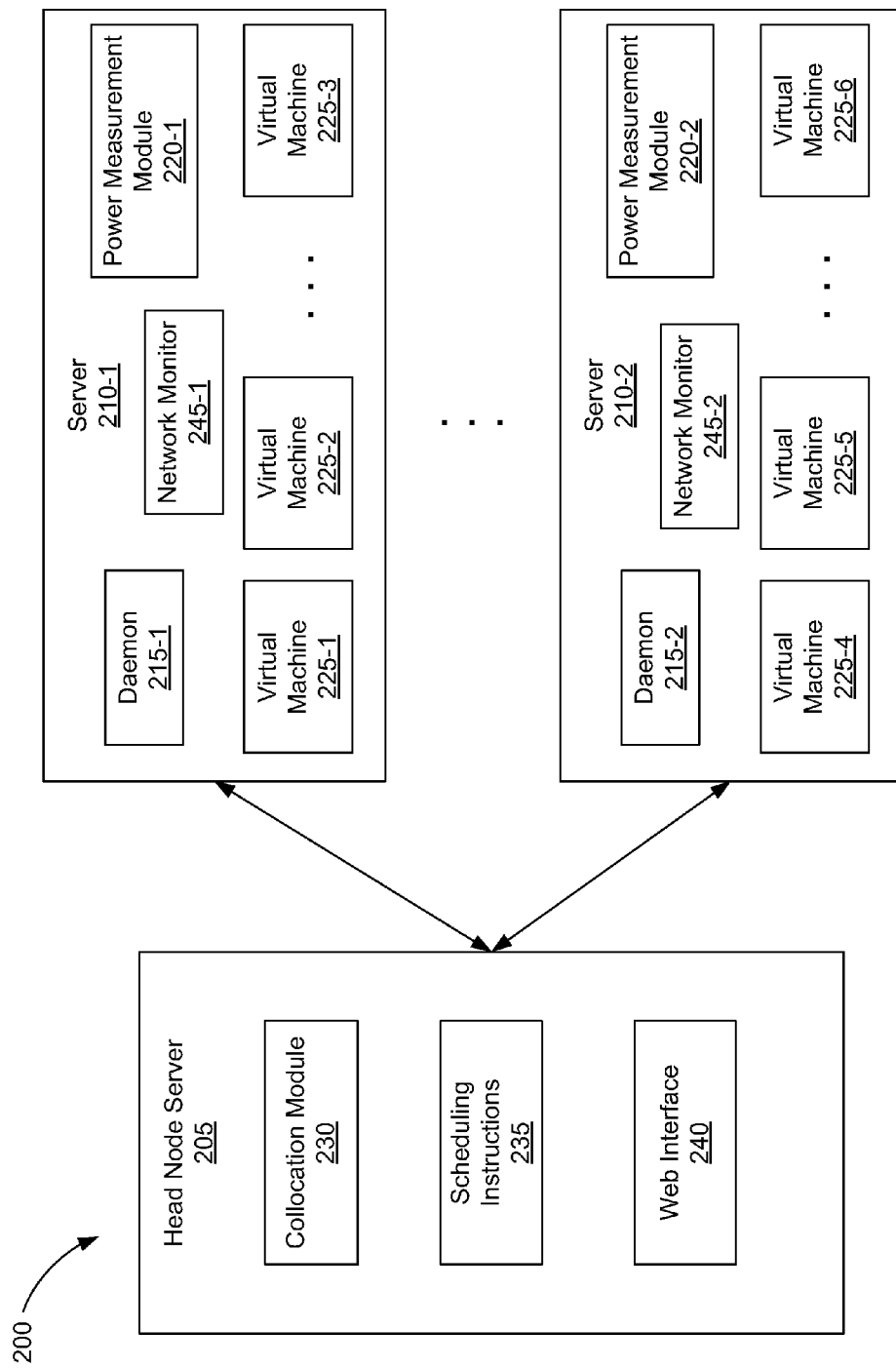
FIG. 2 is a block diagram of a system (200) for collocating a number of workloads in a datacenter according to one example of principles described herein.

Turning now to FIG. 2, a block diagram of a system (200) for collocating a number of workloads in a datacenter is shown according to one example of principles described herein. Similar to FIG. 1, the system (200) may include a head node server (205) and a number of servers (210-1, 210-2).

Each server within the number of servers (210-1, 210-2) comprises a daemon (215-1, 215-2), a power measurement module (220-1, 220-2), and a number of virtual machines (225-1, 225-2, 225-3, 225-4, 225-5, 225-6). The daemon (215-1, 215-2) may scan for any virtual machines (225-1, 225-2, 225-3, 225-4, 225-5, 225-6) running on each individual server (210-1, 210-2). When the number of virtual machines (225-1, 225-2, 225-3, 225-4, 225-5, 225-6) has been discovered, the daemon (215-1, 215-2) may, at least periodically, create a report detailing the virtual machines' (225-1, 225-2, 225-3, 225-4, 225-5, 225-6) resource utilization of, for example, the CPU, memory associated with the server (210-1, 210-2), and network traffic. The daemon (215-1, 215-2) may then send this report to the head node server (205). The resource utilization report contains a utility metric for any given virtual machine (225-1, 225-2, 225-3, 225-4, 225-5, 225-6). The utility metric may be obtained via a utility sensor and reflects how well any virtual machine (225-1, 225-2, 225-3, 225-4, 225-5, 225-6) is performing during a set period of time.

With critical workloads being implemented on the number of servers (210-1, 210-2), a number of workload utility metrics may be used to improve server utilization while maintaining critical workload service level agreements (SLAs). In one example, an average request service time per second metric may be used. In another example, a $99^{th}$ percentile of the request service time may be used. Therefore, if the $99^{th}$ percentile service time crosses the predefined threshold as defined by the workloads' SLAs, then the load on the servers that host the critical tiers is reduced. In another example, if the average service time crosses a predefined threshold as defined by the workloads' associated SLAs, then the load on the servers that host the critical tiers is reduced. In these examples, the threshold of the average service time may be user definable via, for example, the head node server (205). In some cases, the non-critical workloads on a virtual machine (225-1, 225-2, 225-3, 225-4, 225-5, 225-6) should be reduced.

The data defining the request service time statistics described above may be obtained from the server log files (or another source) for the given application or service. In another example, the data defining the request service time statistics may be obtained from a number of network communications to and from clients. A network monitor (245-1, 245-2) on each of the servers (210-1, 210-2) or within the network (for example, by monitoring a mirror of the communications traversing a network switch) may observe these network communications. The network monitor (245-1, 245-2) may periodically calculate the service time and service rate statistics. This data may then be sent to the collocation module (230) and web interface (240). This data is used to demonstrate whether or not the amount of work being done is different before and after the collocation of the workloads onto a sub-set of servers (210-1, 210-2).

With non-critical workloads, online approximations may be used. For example, the number of retired instructions per second may be used as a utility metric. An approximation for the number of retired instructions per second is the amount of the processor time, allocated to a given non-critical workload. Consequently, the CPU utilization during a previous scheduling interval may be used as the utility metric.

The power measurement modules (220-1, 220-2) may monitor and create a report regarding the power consumption of each server (210-1, 210-2). The power measurement modules (220-1, 220-2) may further send this report to the head node server (205) as well. In one example, the generation and upload to the head node server (205) of the resource utilization and power consumption reports happen simultaneously.

The resource utilization and power consumption reports are received at the head node server (205) by a collocation module (230). As the information is received by the head node server (205), the head node server (205), using this information, may decide either to consolidate any number of virtual machines (225-1, 225-2, 225-3, 225-4, 225-5, 225-6) to a server other than where they are located, leave any given virtual machine (225-1, 225-2, 225-3, 225-4, 225-5, 225-6) unchanged, change the amount of resources allocated to any given virtual machine (225-1, 225-2, 225-3, 225-4, 225-5, 225-6), or combinations thereof. The decision on how to proceed as to the above options is facilitated through the use of a number of scheduling instructions (235) stored on the head node server (205). These scheduling instructions may contain rules regarding when and how to collocate any number of virtual machines (225-1, 225-2, 225-3, 225-4, 225-5, 225-6) to any number of servers (210-1, 210-2).

The head node server (205) may then send out to the number of servers (210-1, 210-2) a scheduling decision used to manage the workload of the individual servers (210-1, 210-2). The scheduling decision may include a number of instructions about which physical servers (210-1, 210-2) remain active, which physical servers (210-1, 210-2) will host each virtual machine (225-1, 225-2, 225-3, 225-4, 225-5, 225-6), and which resources will be allocated to each virtual machine (225-1, 225-2, 225-3, 225-4, 225-5, 225-6). In one example, the scheduling decision presented to the servers (210-1, 210-2) may be valid until the next scheduling interval upon which the last scheduling decision is reevaluated and changed.

The head node server (205) may further include a web interface (240). The web interface (240) may visualize resource usage across the number of servers (210-1, 210-2), show the performance levels of each virtual machine (225-1, 225-2, 225-3, 225-4, 225-5, 225-6), and allow a system manager to manually reconfigure the system. In one example, the utility metrics described above may be adjusted individually using the web interface (240). In some examples, a number of SLA violation thresholds (FIG. 4A; C1, C2, C3) may be defined by the administrator using the web interface (240). Additionally, in some examples, the total number of CPU shares allocated to any one critical or non-critical workload may be defined by an administrator through the use of the web interface (240). These values may be predefined by the system (200) and may be subsequently changed or redefined by the administrator of the system (200) to fit the needs of each individual datacenter.

In operation, the system (200) may first be booted along with the daemon (215-1, 215-2) being started on each server (210-1, 210-2). The daemons (215-1, 215-2) collect the resource utilization data described above and send that to the head node server (205). The power measurement modules (220-1, 220-2) on each server (210-1, 210-2) may also collect the power consumption data and send it to the head node server (205). The head node server (205) may then decide either to consolidate any number of virtual machines (225-1, 225-2, 225-3, 225-4, 225-5, 225-6) to a server other than where they are located, leave any given virtual machine (225-1, 225-2, 225-3, 225-4, 225-5, 225-6) unchanged, change the amount of resources allocated to any given virtual machine (225-1, 225-2, 225-3, 225-4, 225-5, 225-6), or combinations thereof.

The resource utilization of the collocation workloads are controlled in three ways: by adjusting the access a critical and non-critical workloads may have to resources (i.e., CPU shares), by isolating the collocated virtual machines (225-1, 225-2, 225-3, 225-4, 225-5, 225-6) through virtual CPU confinement, and controlling the CPU utilization upper limit for the non-critical workloads by limiting CPU usage to a minimum amount.

In adjusting the access a critical and non-critical workloads may have to resources, the order in which the virtual machines (225-1, 225-2, 225-3, 225-4, 225-5, 225-6) are given access to these resources may be prioritized. For example, whenever a non-critical workload is collocated with a critical workload, the system (200) may keep the value of the CPU shares for the non-critical workload relatively low. The shares for the critical workloads on any given virtual machine (225-1, 225-2, 225-3, 225-4, 225-5, 225-6) stay relatively high. Although, the present application may describe the system and process for maximizing server utilization by increasing or decreasing CPU shares for the various workloads, the workloads may have additional or less access to other resources as well. Therefore, the present specification also contemplates limiting each workload's access to other resources, apart from CPU shares, and the examples given here are not meant to be limiting but instead are examples presented for illustration.

The collocated virtual machines (225-1, 225-2, 225-3, 225-4, 225-5, 225-6) are also isolated through virtual CPU confinement. In one example, the virtual CPUs on each server (210-1, 210-2) handling critical workloads may be isolated from the virtual machines (225-1, 225-2, 225-3, 225-4, 225-5, 225-6) handling the non-critical workloads. Often, datacenter servers (210-1, 210-2) have several CPUs with multiple cores for each CPU. Often, each of these cores is shared between multiple collocated virtual machines (225-1, 225-2, 225-3, 225-4, 225-5, 225-6). This could result in resource contention for the CPU cycles and the memory resources local to the shared core. Resource contention is prevented by isolating the virtual CPUs as described above. As described above, although the isolation of critical workloads is described here as being the isolation of critical workloads operating on a number of virtual machines (225-1, 225-2, 225-3, 225-4, 225-5, 225-6), the present specification contemplates the isolation of critical workloads operating on any machine to a subset of resource instances. Therefore, the isolation of critical workloads operating on a number of virtual machines (225-1, 225-2, 225-3, 225-4, 225-5, 225-6) is merely an example to illustrate the principles described herein and is not meant to be limiting.

Further, resource utilization of the collocated workloads is controlled by controlling the CPU utilization upper limit for the non-critical workloads by limiting CPU usage to a minimum amount. In one example, computer instructions, when executed by the CPU, may limit the CPU usage of a chosen process by periodically pausing and resuming the CPU using the SIGSTOP and SIGCONT signals. A SIGSTOP signal is a signal sent to a process to stop it in anticipation of restarting it later. In one example, when the SIGSTOP signal is sent to stop a process, that process is paused in its current state. As such, a SIGCONT may be sent at a later time to restart the process.

The system (200) may, when a non-critical workload is not collocated with a critical workload, set the usage of the CPU handling the non-critical workload to a maximum possible value. In one example, the maximum possible value is equal to the number of virtual CPUs of the given virtual machine (225-1, 225-2, 225-3, 225-4, 225-5, 225-6). If a non-critical workload is collocated with a critical workload, the CPU usage of the virtual machines (225-1, 225-2, 225-3, 225-4, 225-5, 225-6) running the non-critical workloads is limited to a small fraction of the available resources, such as 10% of a single physical core. The system (200) may then observe the performance of the critical workloads and determine whether or not critical workloads are operating within their SLAs. If the critical workloads are operating within their SLAs, then the system (200) increases CPU utilization of a random collocated virtual machines' (225-1, 225-2, 225-3, 225-4, 225-5, 225-6) non-critical workload by a predefined amount such as 10% of a single physical core. Increasing the amount of processes completed for any given server (210-1, 210-2) thereby increasing the work completed per Watt of energy consumed within the servers (210-1, 210-2) of the datacenter. The system (200) may save the name of each of the virtual machines (225-1, 225-2, 225-3, 225-4, 225-5, 225-6) that have had a CPU utilization increase. In one example, the name of each of the virtual machines (225-1, 225-2, 225-3, 225-4, 225-5, 225-6) that had its CPU utilization increased is saved in a stack using a last-in-first-out (LIFO) data structure.

If the service time distribution of any critical workload subsequently violates a related SLA, the virtual machine (225-1, 225-2, 225-3, 225-4, 225-5, 225-6) that was running the non-critical workload and that had recently had its CPU utilization increased is then removed from the stack and its utilization is reduced by, for example, 10% of a virtual CPU. If the stack is empty, the system (200) may select a random virtual machine (225-1, 225-2, 225-3, 225-4, 225-5, 225-6) running a non-critical workload and whose CPU limit is positive and decrease the utilization of that virtual machine (225-1, 225-2, 225-3, 225-4, 225-5, 225-6) by, for example 10%. When a virtual machine (225-1, 225-2, 225-3, 225-4, 225-5, 225-6) running a non-critical workload has its CPU utilization limited to zero, it may be declared to be incompatible with the rest of the virtual machines (225-1, 225-2, 225-3, 225-4, 225-5, 225-6) running a critical workload. In this case, the virtual machine (225-1, 225-2, 225-3, 225-4, 225-5, 225-6) running a non-critical workload that has had its CPU utilization limited to zero does not have any computational resources assigned to it and is paused.

Figure 3:
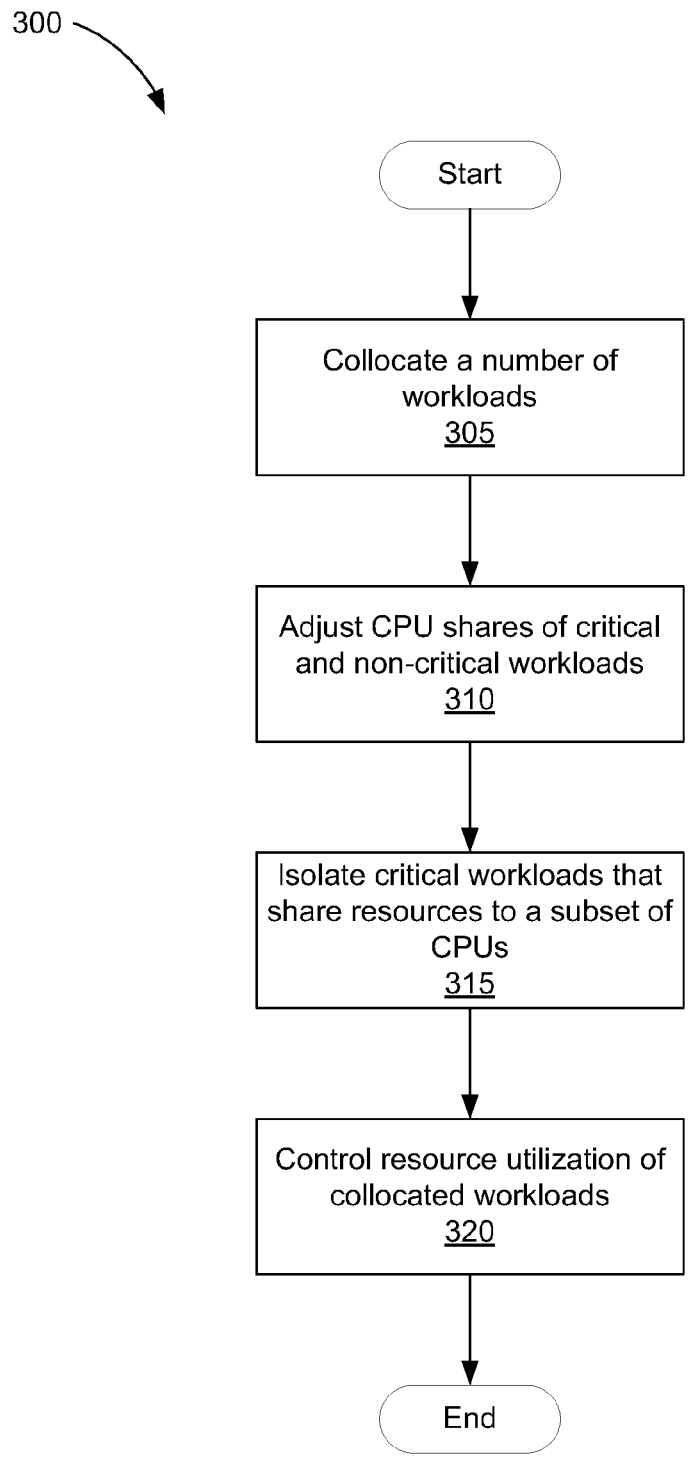
FIG. 3 is a flowchart showing a method of collocating workloads onto a number of central processing units (CPUs) according to one example of the principles described herein.

Turning now to FIG. 3, a method (300) of collocating workloads onto a number of central processing units (CPUs) according to one example of the principles described herein. The method (300) may begin with a number of workloads being collocated (305). Here, a number of workloads are moved to at least a minimal number of CPUs within the data center for processing. This may reduce the number of servers being used allowing those unused servers to power down or otherwise move into an energy saving state thereby reducing the amount of energy used within the datacenter as a whole.

Following the collocation (305) of the workloads, the CPU shares of the critical and non-critical workloads may be adjusted (310). Whenever a non-critical workload is collocated with a critical one, the system (200) may keep the value of the CPU shares for the non-critical workloads low. For example, the number of CPU shares devoted to one non-critical workload may be two. The CPU shares for the critical workloads may remain high, for example, equal to 1024. When the non-critical and critical workloads are increased or set to these number of CPU shares, the non-critical workloads will be given CPU time after the critical workload requests on the CPU are satisfied.

The method may further include isolating (315) the critical workloads that share resources to a subset of CPUs within the entire group of CPUs. Here, contention for CPU cycles between multiple collocated workloads is avoided by isolating virtual CPUs of the critical virtual machines running the critical workloads from the non-critical virtual machines running the non-critical workloads. In this case, virtual CPU processes are pinned to a particular core via, for example, a libvirt CPU pin mechanism. The virtual machines on different cores are isolated (315) first and then the level of isolation is increased by ensuring the critical virtual machines are isolated on the cores of a single memory node. This allows a critical virtual machine running a critical workload with exclusive use of that memory node.

The method may also include controlling (320) the resource utilization of the collocated workloads. In this case, the CPU usage may be limited for a chosen process by periodically pausing and resuming it with a SIGSTOP and SIGCONT command. In this case, signals may be sent to multiple cores at appropriate times specified by an administrator of the system (200). A program such as cpulimit developed by Angelo Marietta may be used to accomplish the timing and sending of the SIGSTOP and SIGCONT command. Again, as described above, the system (200) may adjust the CPU usage of the critical and non-critical workloads. Specifically, if a non-critical workload is collocated with a critical workload, the CPU usage of the virtual machines (225-1, 225-2, 225-3, 225-4, 225-5, 225-6) running the non-critical workloads is limited to a bare minimum such as 10% of a single core. The system (200) may then observe the performance of the critical workloads and determine whether or not critical workloads are operating within their SLAs. If the critical workloads are operating within their SLAs, then the system (200) increases CPU utilization of a random collocated virtual machine's (225-1, 225-2, 225-3, 225-4, 225-5, 225-6) non-critical workload by, for example, 10%. Increasing the amount of processes completed for any given server (210-1, 210-2) thereby increasing the work completed per Watt of energy consumed within the servers (210-1, 210-2) of the datacenter.

Figure 4A:
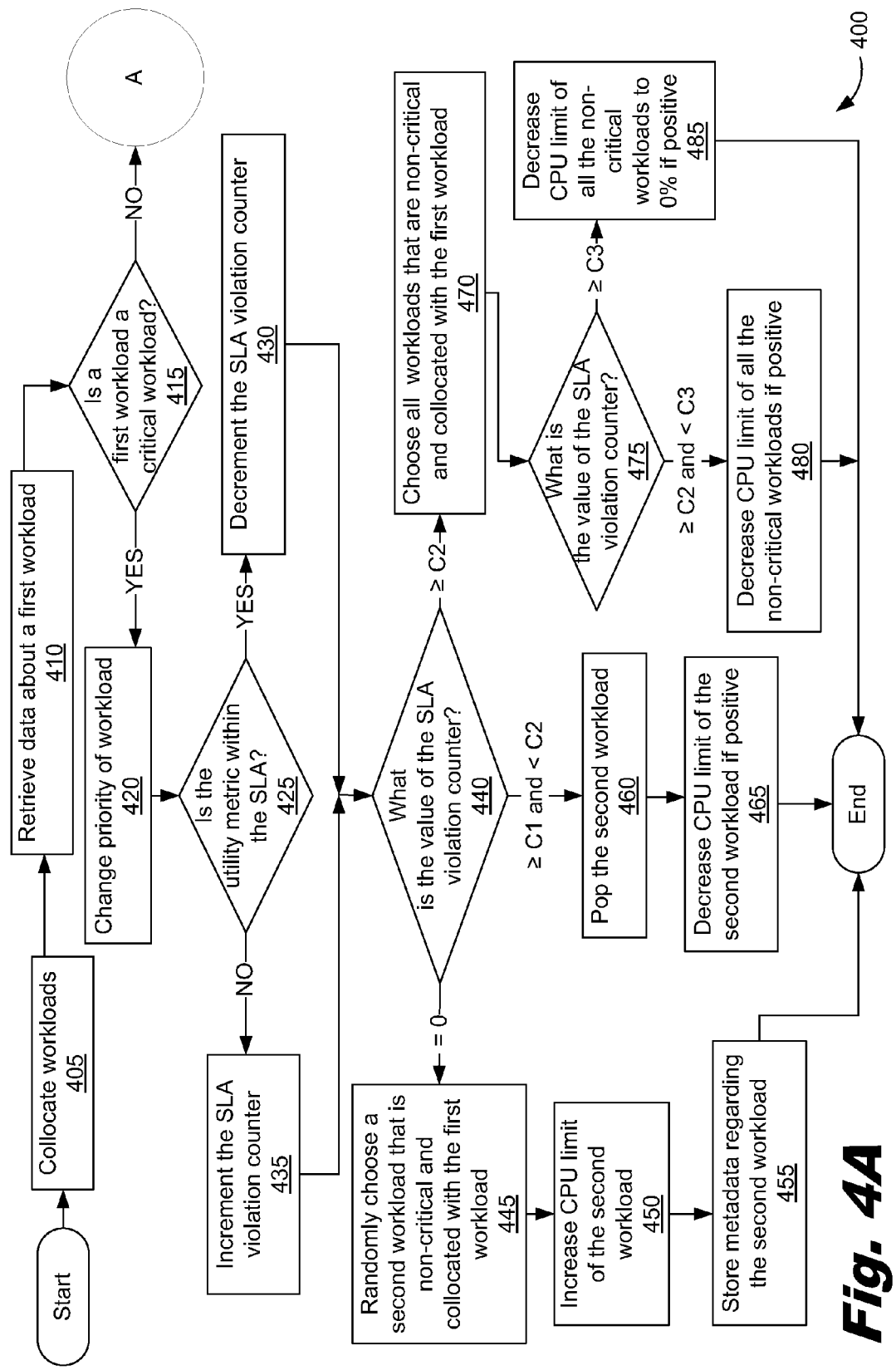
FIGS. 4A and 4B are flowcharts showing another method of collocating workloads onto a number of central processing units (CPUs) according to another example of the principles described herein.
Figure 4B:
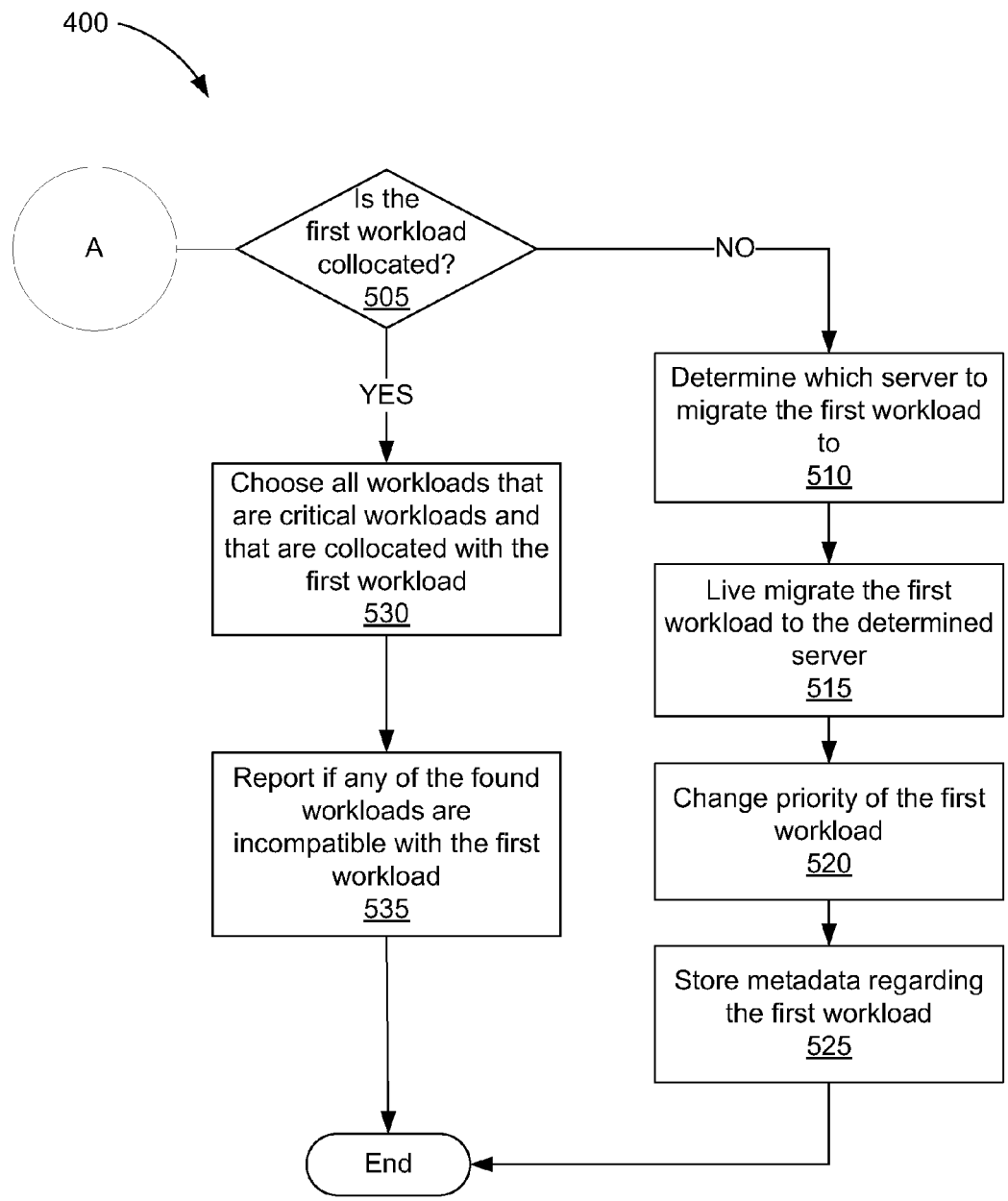

FIGS. 4A and 4B are flowcharts showing another method (400) of collocating workloads onto a number of central processing units (CPUs) according to another example of the principles described herein. The method (400) may begin with collocating (405) the workloads. Again, this process may include moving a number of workloads to at least a minimal number of CPUs within the data center for processing. Next, each workload run on each virtual machine (225-1, 225-2, 225-3, 225-4, 225-5, 225-6) may be analyzed and data may be retrieved (410) about each workload. Specifically, each workload may be analyzed to determine its workload type, its utility metric and its resource value. The workload type may fall into at least two different categories: either a critical or non-critical workload. As discussed above a critical workload is any transaction or interactive service provided by the datacenter where each operator action causes a response from the program or the system.

In one example, a utility metric may be a measurement of an average request service time per second. The utility metric may be used to improve server utilization while maintaining critical workload service level agreements (SLAs). The resource profile may include information about each virtual machines' (225-1, 225-2, 225-3, 225-4, 225-5, 225-6) CPU utilization, each virtual machines' (225-1, 225-2, 225-3, 225-4, 225-5, 225-6) memory footprint, each virtual machines' (225-1, 225-2, 225-3, 225-4, 225-5, 225-6) network traffic, and the last level cache missrate for each virtual machine (225-1, 225-2, 225-3, 225-4, 225-5, 225-6) process identification.

After the above data has been retrieved (405) for a workload, it is then determined (415) whether the workload is a critical workload or not. If the workload is critical (Determination YES, 415), the priority of the critical workload is changed (420) and the virtual CPUs are isolated on, for example, dedicated non-uniform memory access (NUMA) nodes in which separated shared caches and memory nodes are adjusted to their own subset of cores. In another example, virtual CPUs may be isolated on a dedicated physical core in the case of a uniform memory access (UMA) system. By default, each core is shared between multiple collocated virtual machines (225-1, 225-2, 225-3, 225-4, 225-5, 225-6), which could result in resource contention for the CPU cycles and the memory resources. In this case, the virtual CPUs of the critical virtual machines (225-1, 225-2, 225-3, 225-4, 225-5, 225-6) are isolated from those of the non-critical ones.

In one example, the CPU shares of the critical workloads are increased above those of the non-critical workloads. In another example, the number of CPU shares given to the critical workloads is 1,024. Raising the CPU shares for the critical workloads ensures that the non-critical workloads will be given CPU time after the critical workload requests on the CPU are satisfied.

It is then determined (425) whether the utility metric is within the SLA. If the utility metric is within the SLA (Determination YES, 425) then the SLA violation counter for that workload is decremented (430). Conversely, if the utility metric is not within the SLA (Determination NO, 425) then the SLA violation counter for that workload is incremented (435). These output values are then used to complete the method. Additionally, in one example, the SLA violation count for each individual workload may remain associated with each of the respective workloads through the process and may be considered further so as to further decrease or increase the CPU limits for these workloads.

Specifically, with this information, the method can determine the number of non-critical workloads that may send requests to the virtual machine (225-1, 225-2, 225-3, 225-4, 225-5, 225-6). To accomplish this, it is determined (440) what the value of the SLA violation counter is. If the violation counter value is equal to "0" (Determination "=0", 440) this means that the critical workloads on the virtual machine (225-1, 225-2, 225-3, 225-4, 225-5, 225-6) have sufficient resources. In this case, a second workload is randomly chosen (445) among those non-critical workloads that have been collocated with the critical workload. After this, the CPU limit of the second workload may be increased (450) by an amount. In one example, the CPU utilization of the second workload is increased by, for example, 10%. As described above, in one example a program such as cpulimit (developed by Angelo Marietta) may set a CPU cap. Cpulimit may then use the process identification of the workload as an input parameter. Alternatively, in the case of a kernel-based virtual machine, the process identification is determined via, for example, the control groups (cgroups) Linux kernel feature.

The metadata about the second workload in the form of the process identification or virtual machine name associated with the workload is then stored (455) in a data structure. In one example, the workload metadata is pushed according to the last-in-first—out handling of the first workloads stack. Each critical workload has an associated program stack. The stack may be filled with metadata about non-critical workloads that were recently migrated on the first workload's physical machine (225-1, 225-2, 225-3, 225-4, 225-5, 225-6). The last-in-first—out handling of the first workloads stack helps to quickly react to the recent changed in the workload as increasing the number of collocated workloads and their resource utilization is the most probable source of potential SLA violations.

If the violation counter value is greater than or equal to a first threshold, but less than a second threshold (Determination "≥C1 and <C2", 440), then it can be determined that the critical workloads are not satisfying their SLAs and their performance has been decreased. In this case, the second workload's virtual machine name or process identification is popped (460) or removed from the data structure (i.e., stack) and the CPU limit of the second workload is decreased (465) if it is positive. The values of "C1" and "C2" may be predetermined and set by an administrator. In one example, C1 may be set to 15 SLA violations and C2 may be set to 30 SLA violations.

If the violation counter value is greater than or equal to the second threshold (Determination "≥C2", 440), then all of the non-critical workloads that have been collocated with the first critical workload are chosen (470) and it is then determined (475) where the value of the SLA violations are. If the value of the SLA violation for the first critical workload is greater than or equal to the second threshold, but less than a third threshold (Determination "≥C2 and <C3", 475) then the CPU limit of all the non-critical workloads collocated with the first workload is decreased (480) if it is positive. In one example, the CPU limit of the non-critical workloads is decreased by, for example, 10%. In some examples, the value of "C3" can be any integer. In one example, the value of "C3" is 60 SLA violations. In this example, therefore, when the SLA violation has occurred in at least 60 intervals over the whole interval with the SLAs determined by comparing the utility metric, the CPU limit of the non-critical workloads is decreased.

However, if the value of the SLA violation for the first critical workload is greater than or equal to the third threshold (Determination "≥C3", 475) then the CPU limit of all of the non-critical workloads collocated with the first workload is decreased (480) to 0% if it is positive. In this way, any non-critical workload collocated with the critical workload on any given virtual machine (225-1, 225-2, 225-3, 225-4, 225-5, 225-6) may have its CPU limit increased, decreased or put on hold all together. This may be done so as to effectively collocate workloads on to a subset of CPUs while still allowing critical applications to run effectively on those CPUs.

The method may also account for the non-critical workloads. Therefore, if it is determined that the first workload is a non-critical workload (Determination No, 415) then the process moves to FIG. 4B as indicated by the "A" within the circle on FIGS. 4A and 4B. It is then determined (505) whether the first non-critical workload or workload has been collocated. If the workload is not collocated (Determination No, 505), then it is determined (510) which server to migrate the first workload to. Here, this is done for each non-critical workload that was not collocated at the time the collocation request is posted to the system (200). In this case, the system (200) scans the number of servers in the datacenter and chooses one that 1) has an appropriate amount of memory to host the first non-critical workload's footprint; and 2) does not host a critical workload tier that is incompatible with the first workload. Among the refined options above, the server to be chosen will be based on each server's resource utilization and the first workload's resource profile. In this way, the probability of conflicts between workloads is minimized. In one example, if the first workload has significant network traffic, then the server with the lowest total network traffic will be chosen. In other examples, the least loaded server in terms of virtual CPUs/physical core ratios will be chosen. Once chosen, the first workload may be migrated (515) to that determined server.

The priority of the first workload may then be changed as previously mentioned. In this case, however, since this is a non-critical workload, the CPU shares may be limited to a certain amount (i.e., 2), set the first workload's CPU limit to, for example, 10%, and confine the first workloads virtual CPUs to a subset of cores based on the missrate. After this, the first workload is then stored (525) as described above. Therefore, in one example, the workload metadata is pushed. Here, the process identification or virtual machine name associated with the workload is stored in a data structure such as a stack. In one example, the pushing may be done according to the last-in-first—out handling of the first workloads stack as discussed above.

If the first workload has been collocated (Determination YES, 505), then all workloads that are critical workloads and collocated with the first workload are chosen (530) and any workloads that are incompatible with the first workload are reported (535). Specifically, a non-critical workload is deemed to be incompatible with a critical workload if the non-critical workload has been penalized down to a CPU limit of zero for, for example, 10 consecutive scheduling intervals since its last collocation with the critical workload. As discussed above, a reason why the non-critical workload is at 0% CPU usage or paused is because the execution of the non-critical workload consistently caused the critical workload to violate its SLA. In this case, the system (200) will report (535) to the web interface (240) that the non-critical first workload is incompatible. The incompatible non-critical workload is then migrated away from the critical workload so that the critical workload can move forward with its execution and not violate its SLA anymore. In one example, the system (200) may remember that this non-critical workload is not compatible with the critical workload for the next, for example, 100 scheduling intervals.

With the use of the above methods, a datacenter may run fewer servers at higher capacity while still meeting the different SLAs of the individual workloads. Through this method, and during low usage times of the datacenter and throughout the use of the system (200), individual servers may be turned off after the system (200) has collocated the workloads. As more workloads enter the system (200) the datacenter may turn on additional servers when needed, but still only those servers which will be used to satisfy all of the SLAs for each of the workloads in the system (200).

The specification and figures describe a system (200) and method (400) of maximizing server utilization within a datacenter. The implementation of the method on the system (200) provides for a decrease in the power consumption of the datacenter as a whole by collocating the workloads. Using the method described, collocation of the workloads also allows a number of critical workloads to be running along with non-critical workloads such that utilization of each of the servers involved are running at maximum capacity. Any violation of an SLA associated with a workload will be handled by assigning more CPU shares to the critical workloads than the non-critical workloads. Indeed, any relatively serious violation of an SLA associated with a critical workload may potentially result in the non-critical workload being halted. Still further, where a number of non-critical workloads may be paired with a critical workload, the server handling these workloads will increase its ratio of power consumption and utilization creating a relatively more efficient datacenter.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for collocating workloads in a datacenter, the system comprising:
   a number of servers communicatively coupled to each other;
   a collocation module to receive information from each server and decide whether to migrate a workload running on one of the number of servers to another server;
   a daemon to find and periodically create a report about each servers' resource utilization on that server;
   a power measurement module to compile data defining the power consumption of the server; and
   wherein the collocation module compares a utility metric of a critical workload with a service level agreement (SLA) and when:
      the utility metric is not in violation of the defined SLA, an SLA violation counter is decremented for the critical workload;
      the utility metric is in violation of the defined SLA, the SLA violation counter is incremented for the critical workload.

2. The system of claim 1, in which the collocation module further adjusts CPU shares assigned to a critical and a non-critical workload by assigning a smaller number of CPU shares to the non-critical workload relative to the number of CPU shares assigned to the critical workload.

3. The system of claim 2, in which the CPU limit assigned to each non-critical workload is increased or decreased based on the number of times an SLA associated with a critical workload collocated with the non-critical workload has been violated.

4. The system of claim 3, wherein the CPU limit assigned to each non-critical workload is limited by periodically pausing and resuming the CPU using a SIGSTOP and a SIGCONT signal.

5. The system of claim 2, in which the collocation module further determines if a non-critical workload has been collocated, and if not, chooses a server to migrate the non-critical workload to, migrates the non-critical workload to the chosen server, assigns a smaller number of CPU shares to the non-critical workload relative to the number of CPU shares assigned to a critical workload associated with the non-critical workload, and sets a CPU limit for the non-critical workload to a predefined amount.

6. The system of claim 1, in which the collocation module collocates critical and non-critical workloads onto a subset of servers and turns off those servers that do not have a workloads executed thereon.

7. The system of claim 1, in which the collocation module further adjusts access to resources of a critical and a non-critical workload by decreasing the amount of access to resources assigned to the non-critical workloads compared to the amount of access to resources assigned to the critical workload.

8. A method of maximizing server utilization within a datacenter comprising:
   collocating a number of workloads to a subset of a number of physical servers within a datacenter;
   adjusting access to resources by critical and non-critical workloads;
   isolating a number of critical workloads that share resources to the subset of the number of resource instances;
   controlling resource utilization of the collocated workloads; and
   comparing a utility metric of a critical workload with a service level agreement (SLA) of the critical workload wherein:
      when the utility metric is within the defined SLA, an SLA violation counter is decremented for the critical workload; and
      when the utility metric is not within the defined SLA, the SLA violation counter is incremented for the critical workload.

9. The method of claim 8, in which the value of the SLA violation counter determines whether a non-critical workload associated with the critical workload is given greater access to resources or has its access to resources limited.

10. The method of claim 9, in which a number of SLA violation counter thresholds are used to determine whether a non-critical workload associated with the critical workload is given greater access to resources or has its access to resources limited.

11. The method of claim 9, in which:
if the number of SLA violations is zero, a random non-critical workload associated with the critical workload is chosen and has its access to resources increased;
if the number of SLA violations is equal to or greater than a first threshold but less than a second threshold, a non-critical workload associated with the critical workload has its access to resources decreased if positive;
if the number of SLA violations is equal to or greater than the second threshold but less than a third threshold, all non-critical workloads associated with the critical workload have their access to resources decreased if positive; and
if the number of SLA violations is equal to or greater than the third threshold, all non-critical workloads associated with the critical workload have their access to resources decreased to zero if positive.

12. The method of claim 8, in which adjusting access to resources by the critical and non-critical workloads further comprises adjusting central processing shares of critical and non-critical workloads, in which:
adjusting central processing shares of critical and non-critical workloads comprises, assigning to a critical workload priority access to the number of resources relative to a number of non-critical workloads.

13. The method of claim 8, further comprising:
determining if a workload is a non-critical workload;
if the workload is a non-critical workload, determining if the non-critical workload is collocated; and
if the non-critical workload is not collocated:
determining which resource instance to migrate the non-critical workload to and choosing that resource instance to migrate the non-critical workload to;
migrating the non-critical workload to the chosen resource instance;
decreasing the non-critical workload's access to resources compared to the amount of access a critical workload associated with the non-critical workload has; and
setting the amount of access to resources for the non-critical workload to a predefined amount.

14. The computer program product of claim 8, further comprising computer usable program code to, when executed by a processor, determine if a workload is a non-critical workload such that where:
when the workload is determined to be a non-critical workload, the computer usable program code, when executed by a processor, determines whether the non-critical workload is collocated; and
when the non-critical workload is not collocated the computer usable program code, when executed by a processor:
determines which resource instance to migrate the non-critical workload to and selects that resource instance to migrate the non-critical workload to;
migrates the non-critical workload to the chosen resource instance;
decreases the non-critical workload's access to resources compared to the amount of access a critical workload associated with the non-critical workload has; and
sets the amount of access to resources for the non-critical workload to a predefined amount.

15. A computer program product for maximizing server utilization within a datacenter, the computer program product comprising:
a non-transitory computer readable storage medium having computer usable program code embodied therewith, the computer usable program code comprising:
computer usable program code to, when executed by a processor, collocating a number of workloads to a subset of a number of servers within a datacenter;
computer usable program code to, when executed by a processor, adjust access to resources by a number of critical and non-critical workloads;
computer usable program code to, when executed by a processor, isolate the critical workloads that share resources to the subset of the number of resource instances;
computer usable program code to, when executed by a processor, control resource utilization of the collocated workloads; and
computer usable programmable code to, when executed by a processor, change the value of a service level agreement (SLA) violation counter based on whether a utility metric satisfies an SLA.

16. The computer program product of claim 15, wherein the value of the SLA violation counter determines whether at least one of the number of non-critical workloads associated with at least one critical workload is given greater access to resources or has its access to resources limited.

17. The computer program product of claim 16, wherein a number of SLA violation counter thresholds are used to determine whether the non-critical workload associated with the at least one critical workload is given greater access to resources or has its access to resources limited.

18. The computer program product of claim 16, further comprising computer usable programmable code to, when executed by a processor, to determine if the number of SLA violations is zero, if the number of SLA violations is equal to or greater than a first threshold but less than a second threshold, if the number of SLA violations is equal to or greater than the second threshold but less than a third threshold, or if the number of SLA violations is equal to or greater than the third threshold, where:
when the number of SLA violations is zero, a random non-critical workload associated with the critical workload is chosen and has its access to resources increased;
where the number of SLA violations is equal to or greater than a first threshold but less than a second threshold, a non-critical workload associated with the critical workload has its access to resources decreased if positive;
when the number of SLA violations is equal to or greater than the second threshold but less than a third threshold, all non-critical workloads associated with the critical workload have their access to resources decreased if positive; and
when the number of SLA violations is equal to or greater than the third threshold, all non-critical workloads associated with the critical workload have their access to resources decreased to zero if positive.

19. The computer program product of claim 15, further comprising computer usable programmable code to, when executed by a processor, adjust access to resources by the critical and non-critical workloads and adjust central processing shares of critical and non-critical workloads, in which adjusting central processing shares of critical and non-critical workloads comprises assigning to the critical workloads priority access to the number of resources relative to a number of non-critical workloads.

* * * * *